United States Patent
Carl (10) Patent No.: US 10,218,633 B2
(45) Date of Patent: *Feb. 26, 2019

(54) IMPLEMENTATION OF A SERVICE THAT COORDINATES THE PLACEMENT AND EXECUTION OF CONTAINERS

(71) Applicant: Amazon Technologies, Inc., Reno, NV (US)

(72) Inventor: Craig Keith Carl, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 752 days.

This patent is subject to a terminal disclaimer.

(21) Appl. No.: 14/229,702

(22) Filed: Mar. 28, 2014

(65) Prior Publication Data

US 2015/0281111 A1 Oct. 1, 2015

(51) Int. Cl.
*H04L 29/08* (2006.01)
*H04L 12/24* (2006.01)
(Continued)

(52) U.S. Cl.
CPC .................................. *H04L 47/70* (2013.01)

(58) Field of Classification Search
CPC ..... H04L 41/0806; H04L 67/24; H04L 67/20; H04L 67/02
(Continued)

(56) References Cited

U.S. PATENT DOCUMENTS 7,254,634 B1 * 8/2007 Davis ..................... G06F 11/203
709/227
2005/0060553 A1 3/2005 Allen
(Continued)

FOREIGN PATENT DOCUMENTS

| JP | 2009259206 | 11/2009 |
|----|-----------|---------|
| JP | 2011519203 | 6/2011 |

(Continued)

OTHER PUBLICATIONS

International Search Report and Written Opinion dated Jul. 2, 2015, International Patent Application No. PCT/US2015/23167, filed Mar. 27, 2015.

(Continued)

*Primary Examiner* — Kevin T Bates
*Assistant Examiner* — Mark A Scott
(74) *Attorney, Agent, or Firm* — Davis Wright Tremaine LLP (57) ABSTRACT

Organizations are constantly looking for faster and less expensive computer systems to manage businesses; however, the current standard in virtualization techniques includes using virtual machines, which require a long period of time to be instantiated before handling requests and are resource intensive. Using Domain Name System (DNS) queries to a DNS server as an indicator to initiate a virtual resource, such as containers, enables the system to instantiate the container prior to an end user transmitting their first request for a resource stored in that container. Containers can be initialized upon indication of a request, terminated at the end of the request process and initialized again for a next request as they can be activated at very fast speeds as needed. Additionally, using DNS queries as indicators to warm a cache of a network component enables the system components to be imminently used, to be pre-loaded with requested resources.

20 Claims, 8 Drawing Sheets

(51) Int. Cl.
*G06F 15/16* (2006.01)
*H04L 12/911* (2013.01)

(58) Field of Classification Search
USPC .......................................................... 709/226
See application file for complete search history.

(56) References Cited

U.S. PATENT DOCUMENTS

| | | | |
|---|---|---|---|
| 2005/0108702 A1 | 5/2005 | Baker et al. | |
| 2007/0244987 A1* | 10/2007 | Pedersen | H04L 63/0272 709/217 |
| 2007/0260723 A1* | 11/2007 | Cohen | G06F 9/5027 709/223 |
| 2008/0072235 A1* | 3/2008 | Rodgers | G06F 9/44521 718/108 |
| 2008/0170579 A1 | 7/2008 | Chafle et al. | |
| 2008/0208961 A1* | 8/2008 | Kim | G06F 17/30902 709/203 |
| 2009/0222583 A1* | 9/2009 | Josefsberg | H04L 67/1002 709/245 |
| 2009/0248787 A1* | 10/2009 | Sivasubramanian | G06F 17/30887 709/201 |
| 2009/0271472 A1 | 10/2009 | Scheifler et al. | |
| 2009/0288084 A1* | 11/2009 | Astete | G06F 9/45533 718/1 |
| 2009/0327517 A1* | 12/2009 | Sivasubramanian | H04L 29/12132 709/238 |
| 2010/0049872 A1* | 2/2010 | Roskind | G06F 17/30902 709/245 |
| 2010/0050173 A1 | 2/2010 | Hensbergen | |
| 2010/0057936 A1* | 3/2010 | Roskind | H04L 29/12066 709/245 |
| 2010/0125675 A1* | 5/2010 | Richardson | H04L 29/12066 709/242 |
| 2010/0306409 A1* | 12/2010 | Jansen | H04L 29/12066 709/245 |
| 2011/0153840 A1* | 6/2011 | Narayana | H04L 67/1029 709/227 |
| 2011/0173251 A1* | 7/2011 | Sandhu | G06F 8/61 709/203 |
| 2011/0238792 A1* | 9/2011 | Phillips | G06F 15/177 709/220 |
| 2011/0252420 A1* | 10/2011 | Tung | G06F 9/5072 718/1 |
| 2011/0265147 A1 | 10/2011 | Liu | |
| 2012/0203823 A1* | 8/2012 | Manglik | G06F 9/5072 709/203 |
| 2012/0203890 A1* | 8/2012 | Reynolds | G06F 11/3495 709/224 |
| 2012/0233668 A1 | 9/2012 | Leafe et al. | |
| 2012/0266156 A1* | 10/2012 | Spivak | G06F 9/5055 717/172 |
| 2013/0007241 A1* | 1/2013 | Trahan | H04L 67/40 709/223 |
| 2013/0054675 A1* | 2/2013 | Jenkins | G06F 17/30899 709/203 |
| 2013/0073601 A1* | 3/2013 | Jenkins | G06F 9/547 709/201 |
| 2013/0073716 A1* | 3/2013 | DeJana | G06F 9/5077 709/224 |
| 2013/0080623 A1* | 3/2013 | Thireault | G06F 9/5027 709/224 |
| 2013/0086188 A1* | 4/2013 | Mays | H04L 51/36 709/206 |
| 2013/0103520 A1* | 4/2013 | Lyon | G06Q 30/02 705/26.1 |
| 2013/0103785 A1* | 4/2013 | Lyon | H04N 21/2385 709/217 |
| 2013/0124807 A1* | 5/2013 | Nielsen | G06F 11/1438 711/162 |
| 2013/0326599 A1* | 12/2013 | Bray | H04L 61/1511 726/6 |
| 2013/0339510 A1* | 12/2013 | Douglas | H04L 41/5077 709/223 |
| 2014/0006577 A1* | 1/2014 | Joe | H04L 61/1511 709/223 |
| 2014/0019577 A1* | 1/2014 | Lobo | H04L 67/2842 709/213 |
| 2014/0023082 A1* | 1/2014 | Mazarick | H04L 12/4641 370/395.53 |
| 2014/0059226 A1* | 2/2014 | Messerli | G06F 9/5072 709/226 |
| 2014/0074973 A1* | 3/2014 | Kumar | H04L 67/32 709/217 |
| 2014/0075433 A1* | 3/2014 | Kotton | G06F 9/45558 718/1 |
| 2014/0080428 A1* | 3/2014 | Rhoads | G06F 17/30241 455/88 |
| 2014/0189071 A1* | 7/2014 | Leighton | H04L 67/2847 709/219 |
| 2014/0207912 A1* | 7/2014 | Thibeault | H04L 65/4084 709/219 |
| 2014/0280963 A1* | 9/2014 | Burbridge | H04L 61/1511 709/226 |
| 2014/0282889 A1* | 9/2014 | Ishaya | H04L 63/08 726/4 |
| 2014/0358925 A1* | 12/2014 | Jakobowski | G06F 17/30091 707/737 |
| 2015/0067819 A1* | 3/2015 | Shribman | H04L 67/06 726/12 |
| 2015/0074221 A1* | 3/2015 | Kuparinen | H04L 29/12066 709/214 |
| 2015/0095296 A1* | 4/2015 | Nandwani | H04L 63/105 707/694 |
| 2015/0120939 A1* | 4/2015 | Islam | H04L 47/70 709/226 |
| 2015/0180992 A1* | 6/2015 | Thibeault | H04L 67/24 709/201 |
| 2015/0215267 A1* | 7/2015 | Kagan | H04L 61/1511 709/245 |
| 2015/0281947 A1* | 10/2015 | Patil | H04W 8/26 370/329 |
| 2016/0044035 A1* | 2/2016 | Huang | H04L 63/0272 726/4 |
| 2016/0173636 A1* | 6/2016 | Wang | H04L 67/2842 709/213 |
| 2016/0191646 A1* | 6/2016 | Yang | H04L 67/22 709/213 |
| 2016/0197843 A1* | 7/2016 | Palan | G06F 9/5072 709/226 |
| 2016/0212012 A1* | 7/2016 | Young | H04L 41/14 |
| 2016/0285780 A1* | 9/2016 | Strijkers | H04L 67/10 |
| 2017/0048314 A1* | 2/2017 | Aerdts | G06F 9/5083 |
| 2017/0223117 A1* | 8/2017 | Messerli | H04L 67/16 |

FOREIGN PATENT DOCUMENTS

| | | |
|---|---|---|
| JP | 2013191958 | 9/2013 |
| WO | WO2010025373 | 3/2010 |
| WO | WO2012152824 | 11/2012 |
| WO | 2013119841 | 8/2013 |
| WO | WO2013177246 | 11/2013 |

OTHER PUBLICATIONS

Japanese Office Action, dated Sep. 25, 2017, for Application No. 2016-558406, 4 pages.
Canadian Office Action for Patent Application No. 2,943,492 dated May 11, 2018, 6 pages.
European Rule 70 Communication dated Mar. 20, 2018, for Application No. 15768533.0, 1 page.
Chinese Office Action for Patent Application No. 201580016743.0, dated Sep. 29, 2018, 18 pages.

* cited by examiner

IMPLEMENTATION OF A SERVICE THAT COORDINATES THE PLACEMENT AND EXECUTION OF CONTAINERS

BACKGROUND

Companies, organizations and individuals around the world operate computer networks that operably interconnect computing devices to support businesses, provide resources and deliver services. Many of those parties receive access to software applications from service providers that may host physical computing devices in data centers around the world. Recently, service providers have been offering virtualization systems to provide access to the software applications for these companies. However, conventional virtualization techniques, such as virtual machines, are subject to fundamental limitations of the ability to scale down the resources required to service a request and the amortization of costs for spinning up and tearing down a virtual computer system. For example, with many applications, a virtual computer system may be used relatively infrequently. To have the virtual machine able to service requests, the virtual machine must be maintained in an operational state, which requires computing resources for the computer system's operating system and other resources (e.g., network resources). When such computer systems are underutilized, only a portion of the overall available resources are being used at any given time and at least some of resources allocated to those computer systems are generally unavailable for other uses.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include implementations of a service that coordinates the placement and execution of a resource, such as a container, in order to provide increased speed in processing requests, more efficient use of computing resources and reduced latency. When a container is not running, no resources, other than disk space, are being utilized, for example, a terminated container—a container not maintained in an operational state—does not use any resources, such as a central processing unit (CPU) or memory.

Example embodiments include a web service leveraging a Domain Name System (DNS), a load balancer, a database and containers to offer virtualization of computer resources and systems without the overhead associated with virtual machines. When the DNS server receives a DNS lookup for a site hosted on the web service, the server is configured to determine the best region (in terms of latency, for example) to route a user request for a resource, transmit a small message, such as a user datagram protocol packet to a load balancer hosting the service in that region and then responds to the DNS lookup. The load balancer may be configured to use the DNS services' notification to initiate a container such that, by the time an end user makes their first GET, PUT or other request, the container is already instantiated. In some example embodiments, because one user request often indicates additional requests are likely to be made, the container can maintain an operational state for a specified period and the load balancer can maintain information of the state of the container in a database. The DNS server and the load balancer may be further configured to use this information to route additional requests to the container that is already running. When the container is no longer needed, the load balancer, operating system holding the container, or other system component can initiate a termination or de-instantiation of the container such that compute, memory and network resources are only used when they are required and are able to be initialized at a very fast speed as needed.

A Domain Name System (DNS) service may be configured to provide customers a method to route end users to one or more communications network applications. For instance, the DNS service may be configured to translate human-readable names, such as uniform resource locators (URLs), into numeric Internet protocol (IP) addresses that computer systems may use to connect to each other over the Internet. Thus, the DNS service may be configured to connect requests to access one or more services provided by the computing resource service provider to the infrastructure that is operating within a data zone.

Example embodiments include methods and systems for processing client device DNS queries by a DNS service where the DNS query includes an identifier or unique identifier associated with a virtual machine. In some embodiments, the DNS query can be used to initiate the transmission of a message to a resource for which the client device is requesting to access in order to activate or wake-up (bring out of a suspended state where less resources are consumed) that resource before the actual request is sent from the client device.

Client-computing devices can be configured to communicate with one or more service providers and/or network providers over a network in order to resolve DNS queries transmitted by the client device, where the service provider corresponds to computing devices associated with a DNS service provider. The service provider can be associated with various computing resources, including any number point-of-presence (PoP) interfaces that correspond to nodes on a communication network, for example, such as a physical location that houses servers, routers and the like. The PoP locations can be geographically dispersed across a physical communications network in order to provide for the client devices of the network. The service provider can further include DNS components that can include DNS server computing devices that are used to resolve DNS queries from client devices. DNS components may further include hardware and/or software components that facilitate communications, such as load balancing. The service provider can further include resource cache components used to maintain information regarding the status of network resources, devices and/or components of a network.

The client device may have access to services provided by a service provider that may include access to computer services such as containers, virtual machines, automatic scaling groups, file-based database storage systems, block storage services, redundant data storage services, data archive services, data warehousing services, user access management services, content management services and/or other such computer system services. Additional services may include access to computer system services such as directory services and resources such as user resources, policy resources, network resources and/or storage resources associated with the directory services. In some distributed and/or virtualized computer system environments, the resources associated with the computer services may be physical devices, virtual devices, combinations of physical and/or virtual devices or other such device embodiments.

A network provider can include network components for hosting applications via a number of virtualization methods, such as virtual machines, virtual resources or containers. The network components can be operably interconnected to or include computing devices, including hardware and software necessary to provide multiple virtual machines or to dynamically cause the creation of a virtual machine, such as a container or virtual machine. Network components can further be used or include software/hardware components for communicating with other network devices, such as client devices, service providers, DNS services, etc.; where the network components can be used to select virtualization machines to provide information to a DNS server and facilitate routing requests.

When a customer of a client device and network provider are not otherwise communicating, the communication process between the customer and a network provider may begin with a registration process in order to access resources made available by the network provider. A registration process may include many types of information, for example, the registration process with the network provider could include specification of types of hardware and/or software of the client device, configuring security parameters, billing, quality of service, identification information and the like. The customer of the client device may further register with a service provider for similar functions, and may request that the service provider is to process DNS queries for domains and manage the resources made available by the network provider, if the service provider is not already a DNS processing authority.

A client device can interact with components or computing devices of a network provider using a resource identifier, such as a Uniform Resource Identifier (URI), also referred to as a Universal Resource Identifier, or more specifically using a URL. The URL is a specific string that is generally a reference to a resource, such as a webpage. The URL provides a number of pieces of information that are similar to instructions directed at different network components of a communications network. A URL generally includes a protocol, a host and a possible a path of resources, such as identifiers, page address, folder names, machine names and more, for example:

http://www.domain_name.com/path_information

URLs may include additional information such as queries, port numbers or other details associated with a specific resource.

The domain name, which is commonly comprised of alphanumeric characters, is translated into a numeric Internet protocol (IP) address for a specific resource. The domain name portion of the URL may include additional information, such as unique identifiers that correspond to identifiers used by the network provider to manage resources. For example, instead of the example URL presented above, a unique identifier included in a URL may read:

http://www.unique.domain_name.com/path_information

In other example embodiments, the domain name portion of the URL may include additional information to directly or indirectly identify service level information, financial information, geographic information, point-of-presence information and the like. For example, the URL may read:

http://www.billing.unique.host_domain.com/path_information

A URL entered into an address bar of a browser (such as a client) may be transmitted, by the user's computer in a DNS query to a DNS server, which is generally configured to translate the domain information provided in the URL (DNS portion of a DNS query) into an IP address. Alternative example embodiments may include a DNS query being submitted after a user click of an item with a hyperlink, an automated process making a query and the like. Upon resolving the DNS query, the DNS server transmits a response to the client device providing the IP address of the load balancer. However, at that same time or near-same time when the DNS server receives a query for a resource from the client device, the DNS server transmits a message to a load balancer requesting the load balancer to activate a virtual resource in which the requested resource is located. At or around the same time that the client device receives the IP address (which is similarly at or around the same time that the container has been activated), the client device transmits a request to the load balancer for a resource. The load balancer forwards the request to a virtual resource store in which the virtual resource is operably interconnected and the virtual resource and load balancer serve the request back to the user. It should be understood that a DNS server may be a component of a larger system, such as a DNS service or DNS processing system.

For example, a user may want to retrieve an image from an image database website. In this situation, the user would enter the URL of the image database website into their browser to transmit the DNS query and await a response; this DNS query and resolution process is effectively invisible to the user. Upon receipt of the IP address for the URL the user requested, the user's device transmits a request for an image to a proxy server, which can be any intermediate server such as a load balancer. The load balancer can determine the location of the requested data and provide the data to the user incredibly quickly because the requested resource is stored in a container in a container service.

Figure 1:
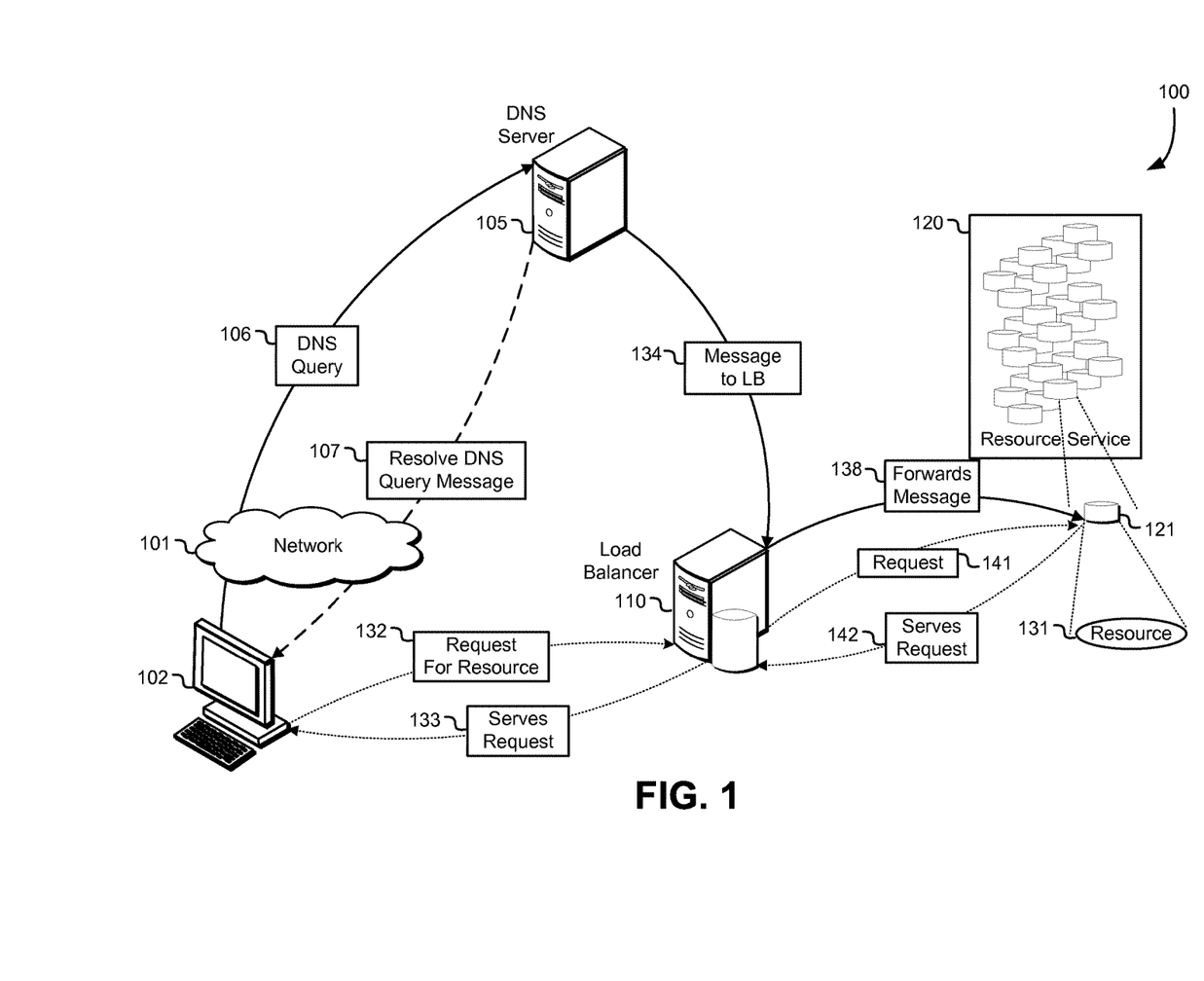
FIG. 1 is an illustrative example of an environment in which various embodiments can be implemented.

FIG. 1 is an example embodiment of an environment 100 for implementing aspects in accordance with various embodiments. As will be appreciated, although an Internet environment 100 is used for purposes of explanation, different environments may be used, as appropriate, to implement various embodiments. The environment includes an electronic client device 102, which can include any appropriate device operable to send and/or receive requests, messages or information over an appropriate network 101 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof.

Example embodiments include a client device 102 connect to a Domain Name System (DNS) server 105 via a network 101, such as the Internet. When a user of the client device enters a Universal Resource Locator (URL) into the web browser (client) on the client device, this activates a DNS resolver (not shown). The DNS resolver is the client-side of the DNS and is configured to initiate and sequence client queries in order to reach a complete translation of the resource queried, e.g., translating the domain name into an Internet protocol (IP) address. This process is transparent to the user.

Returning to FIG. 1, the DNS resolver transmits a DNS query 106 to the DNS server in order to receive an IP address for the requested domain. When the DNS server receives the DNS query, the DNS server is configured to perform at least two operations simultaneously or near simultaneously. In alternative example embodiments, multiple operations may be performed in any sequence and timing arrangements. The first operation is to send a message 134 to a load balancer 110 and the second operation is to resolve the DNS query and reply to the client device (described in detail below). In an example embodiment of the first operation, the DNS server transmits a message to a load balancer, which may be hardware or software. The message may include a user datagram protocol (UDP) message, referred to as a datagram that may be a short 1-2 kB message to inform the load balancer or load-balancing layer that a request is being made or about to be made for a resource in a container. The message is intended to request that the container be instantiated in anticipation of receiving the request in order to process the request more efficiently.

Alternative example embodiments may transmit more complex messages, such as forwarding the DNS query itself. In alternative example embodiments, the DNS server is further configured to selectively provide a message as a result of the URI or URL associated with the container and may further not send a message when the identifier is not associated with any container. Further example embodiments include a message, such as message 134, being transmitted to any network component configured to receive messages of the type, in order to start a resource. For example, a resource could be an item in a cache, in which case the message may be transmitted to a block-level data storage service requesting the service load an image into a memory. Alternative example embodiments may include a message being transmitted from a first location to a back-end network component that does not involve an intermediary.

The load balancer 110 is generally a software application running on a proxy server or intermediary network component or a hardware load balancer that is used for multiple purposes, including for forwarding requests to a back-end server or network components provided by a client or another network component. In the instant example embodiment, the load balancer receives the message from the DNS server requesting activation of a container storing resources requested by the client device. Generally, load balancers have many additional features, which may similarly be used in example embodiments presented herein; for example, load balancers can prioritize activation of servers, direct server return, health checking, HTTP caching, priority queuing and the like. In the example embodiment of FIG. 1, the load balancer is aware of the location of the container that stores the resource based on the name of the resource, which may be identified by a unique identifier, a Uniform Resource Indicator (URI), Uniform Resource Locator (URL) or the like.

The load balancer 110 forwards a message 138, which includes at least the URI or URL to the container 121, which may be one of thousands or millions of containers stored in a resource service 120. The message 138 informs the container that a resource will be requested and the container needs to be placed into an operational state (start) in order to respond to the imminent request efficiently. The container, upon receipt of the message, is initiated or instantiated in an operational state. In some example embodiments, once the container is instantiated, the container has its own IP address, which may be a public or a private IP address. The load balancer, in order to forward traffic to the container, executes a search in a local database of the load balancer or operably interconnected to the load balancer in order to determine the public or private IP address of the newly instantiated container.

In some example embodiments, if the resource being requested is known by the load balancer or DNS server, the container can be configured to locate the exact resource 131 if multiple resources are stored in the container. A container, generally, can contain any type of resource, for example, a copy of a static website, a web resource, a website, an image, a web form, executable code, an application programming interface (API) and the like. In some example embodiments, the data or resources may be accessed by a container from a different location, such as a network device.

Returning to FIG. 1, as described above, the DNS server performs two operations approximately simultaneously. The second operation includes resolving the DNS query and transmitting a reply message 107 from the DNS server to the client device providing the IP address of the requested resource. Upon receipt of the IP address requested by the client device, the client device can transmit a request message 132 for the specified resource. In the instant example embodiment, the request is sent from the client through the intermediary network component (load balancer), which then forwards the request 141 to the activated container. In alternative example embodiments, the request may be served directly to the container or resource service or may be transmitted via two or more intermediary or proxy servers. As the container receives the request for the resource 131, it immediately serves the request 142 back via the load balancer, which in turn servers the request 133 to the client device.

Figure 2:
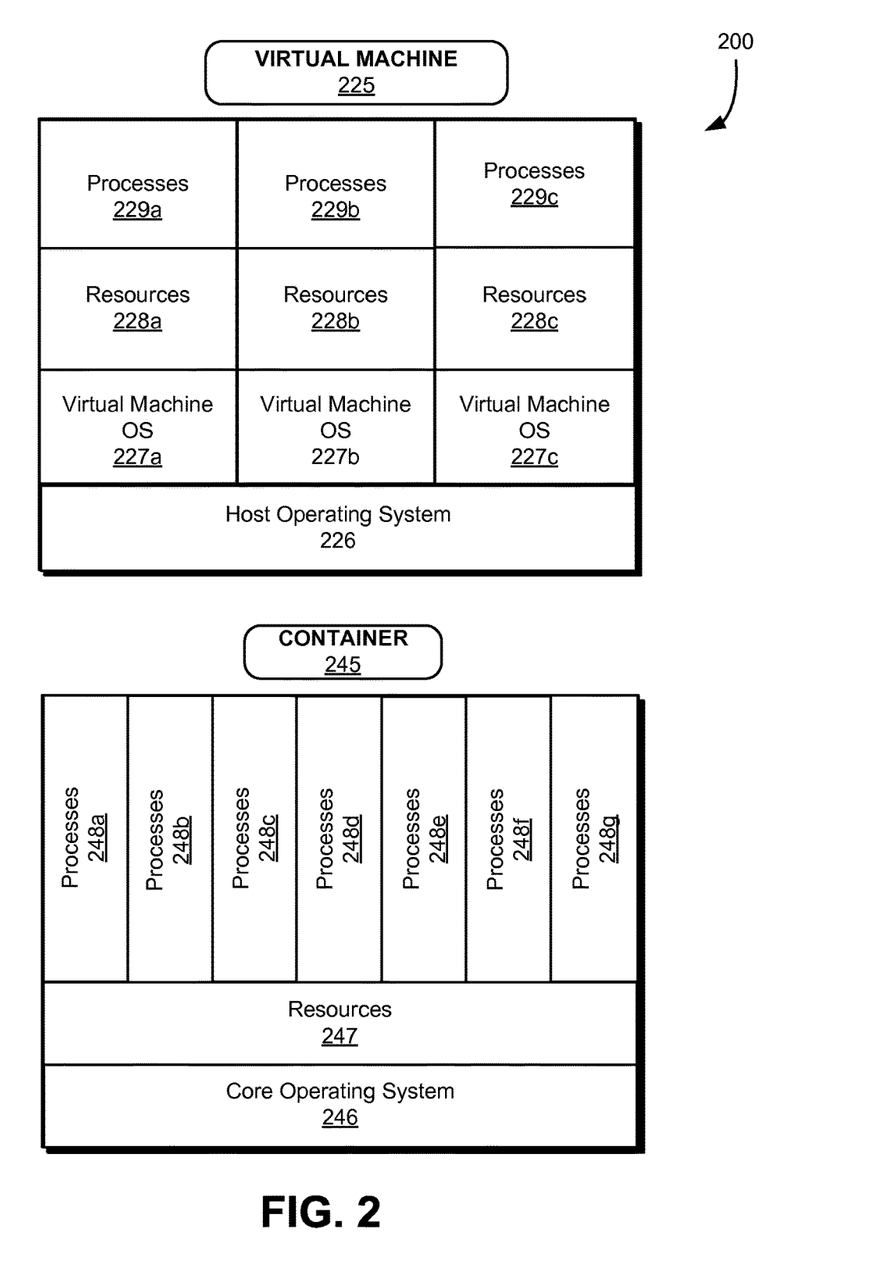
FIG. 2 is an illustrative example of a block diagram in which various embodiments can be implemented.

FIG. 2 is an illustrative example of a block diagram 200 showing a virtual machine 225 and a container resource 245. Generally, a virtual machine is a virtualization of a software implementation on a machine (i.e., a computer) that executes programs like a physical machine. Traditional virtualization requires a full operating system image for each virtual machine. Virtual machines (VMs) generally obtain access to resources from the host machine running a host operating system 226 over a virtualized device and network protocols. Virtual machines are generally resource-extensive and a host machine can only run a limited number of VMs at any given time. For system virtual machines, each maintains a full operating system 227*a-c*, a full set of resources 228*a-c* and any processes 229*a-c* that are applicable for that specific virtual machine.

For example, a virtual machine for processing a request can be instantiated for the purpose of processing the request. In particular, the physical host is used to instantiate the virtual machine for the specific purpose of servicing the request. When the request is received by the physical host or another computer system in communication with the physical host, the physical host accesses information from data storage that enables the physical host to instantiate the virtual machine including an application suitable for processing the request. When the virtual machine is no longer needed in connection with the request, the virtual machine may be de-instantiated. The physical host may de-allocate computing resources allocated to the virtual machine so that the computing resources are usable for other purposes, such as other virtual machines. In this manner, the physical host avoids dedicating computing resources to the virtual machine when the virtual machine is not being used to service a request. Should future requests be received, the physical host may instantiate at least one virtual machine as appropriate.

A container 245 is an operating system-level virtualization method for running multiple isolated systems, referred to herein as containers or containers, on a single control host 246. Example embodiments of containers with a single operating system (OS) are typically more efficient as the container virtualization isolates the guest but does not try to virtualize the hardware of the host machine. In place of hardware virtualization, container virtualization creates a container for each virtual environment, such as application processes 248*a-g*, that can be run using user tools, such as the kernel, which can perform resource management and provide for process isolation such that each container maintains its own file-systems, processes, memory, devices, etc. under the same kernel. Example embodiments of containers can maintain and share a single OS and other resources 247 (e.g., binary files, library resources, etc.) Embodiments of containers run on the same kernel as the host machine, but can run different package tree or distribution, if desired. As containers are generally deployed from the same host OS, container creation and maintenance is significantly less complex than that of a virtual machine.

In some embodiments, a single piece of hardware, e.g., a computer or server, can run thousands of containers, each container sharing the kernel that is on the disk on the physical appliance; the containers on that hardware share all of the resources of the machine, e.g., memory, CPU, etc. The reduced overhead that comes with a container leads to additional advantages of being able to create and provision large numbers of containers (e.g., hundreds of thousands) and each container can have fast startup and shutdown speeds. In some example containers, changes made system-wide are visible in each container, such as host-machine updates. Containers are configured in such a manner that they can be instantiated on demand or upon request from a user or operably interconnected device, terminated or hibernated on command and re-instantiated again, such that when the container is not running, it consumes almost no resources except for hard drive space on the host machine. While containers are used extensively for illustration, the techniques presented herein can be used for other resources, for example, such as a virtual machine instantiated on demand. This application incorporates by reference for all purposes the full disclosure of U.S. patent application Ser. No. 13/964, 977, filed on Aug. 12, 2013, entitled "PER REQUEST COMPUTER SYSTEM INSTANCE."

Figure 3:
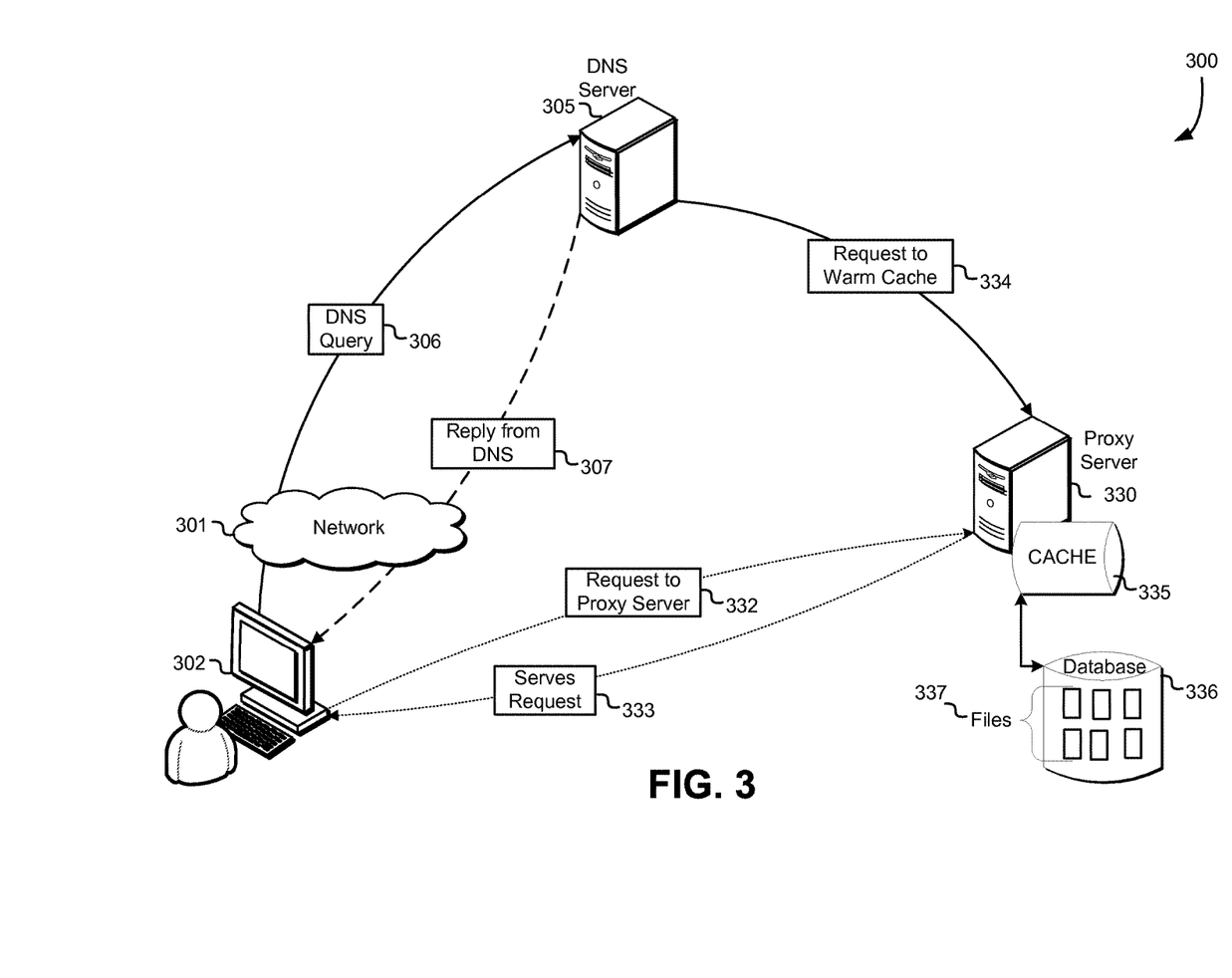
FIG. 3 is an illustrative example of an environment in accordance with at least one embodiment.

FIG. 3 is an illustrative example of an environment 300 showing a Domain Name System (DNS) query used to warm a cache. As is known, a cache is a network component configured to store information or data in a transparent manner such that future requests for the information or data can be served in a fast manner. One of the challenges of supporting a cache at any level of a network or a component of a network, such as a server, is maintaining the cache in an up-to-date (fresh) and non-empty (warm) state, especially when a customer of a client device is not making requests for a resource or information.

A warm cache allows for a fast response to a customer request and relieves the latency that occurs when a request for information is made and a cache must be started from a non-operational state. In some example embodiments, if a cache is empty or in a non-operational state (cold), upon receiving a customer request or an application request, performance problems such as reductions in latency and bandwidth can occur. Maintaining a warm cache provides many benefits, including, for example, reducing execution times for new queries to a volume or database and improving performance when a same or similar query is received at a cache of a volume or database each time the cache is initiated.

An example embodiment of reloading (warming) a cache includes a server determining if a volume of the server, or a database operably interconnected with the server contains previously recorded data or files. When the volume contains the previously recorded information, the server may be configured to load that information into the cache in order to maintain the cache in a non-empty state.

In the example embodiment of FIG. 3, a customer of a client device 302 may transmit, via a network 301, a DNS query 306 to a DNS server 305 requesting an IP address associated with a URL. At approximately the same time or simultaneously, the DNS server is configured to transmit a message requesting the cache be initialized 334 to a proxy server 330, and resolve the DNS query and provide a message 307 to the client device including the IP address. An example embodiment of the DNS message 334 to the proxy server 330 may include a user datagram protocol (UDP) message, referred to as a datagram, that may be a short 1-2 kB message to inform the cache 335 that a request for information will be coming or a longer datagram to request the cache pre-load files 337 from a database 336. The database 336 and cache 335 may be operably interconnected directly or indirectly via additional network components. In such an example embodiment, when client request 332 for files to the proxy server is transmitted, the proxy server is configured to serve the request 333 in an efficient manner as the cache is warmed and pre-loaded with the requested information. Pre-warming or warming the cache may include pre-warming a fast virtual machine, data file, storage system, database or virtual computer system. It should be known that the proxy server can be any intermediary server between the DNS and client, for example, the proxy server may be a load balancer or include a load-balancing layer.

In an alternative example embodiment, caching at a DNS server can occur during a DNS resolution process after receiving a DNS query from a client device. The request or query records may be cached for a period of time, known as cache validity or time to live, in order to reduce network overhead and load on the DNS server resolving the request. The records of queries may remain in a cache associated with the DNS server for the specified amount of time, which can be dynamically adjusted according to network activity or predetermined according to a network administrator or the like. Another example embodiment can include a DNS service component being configured to cache domain names associated with the corresponding IP address in order to respond to a DNS query more efficiently.

Figure 4:
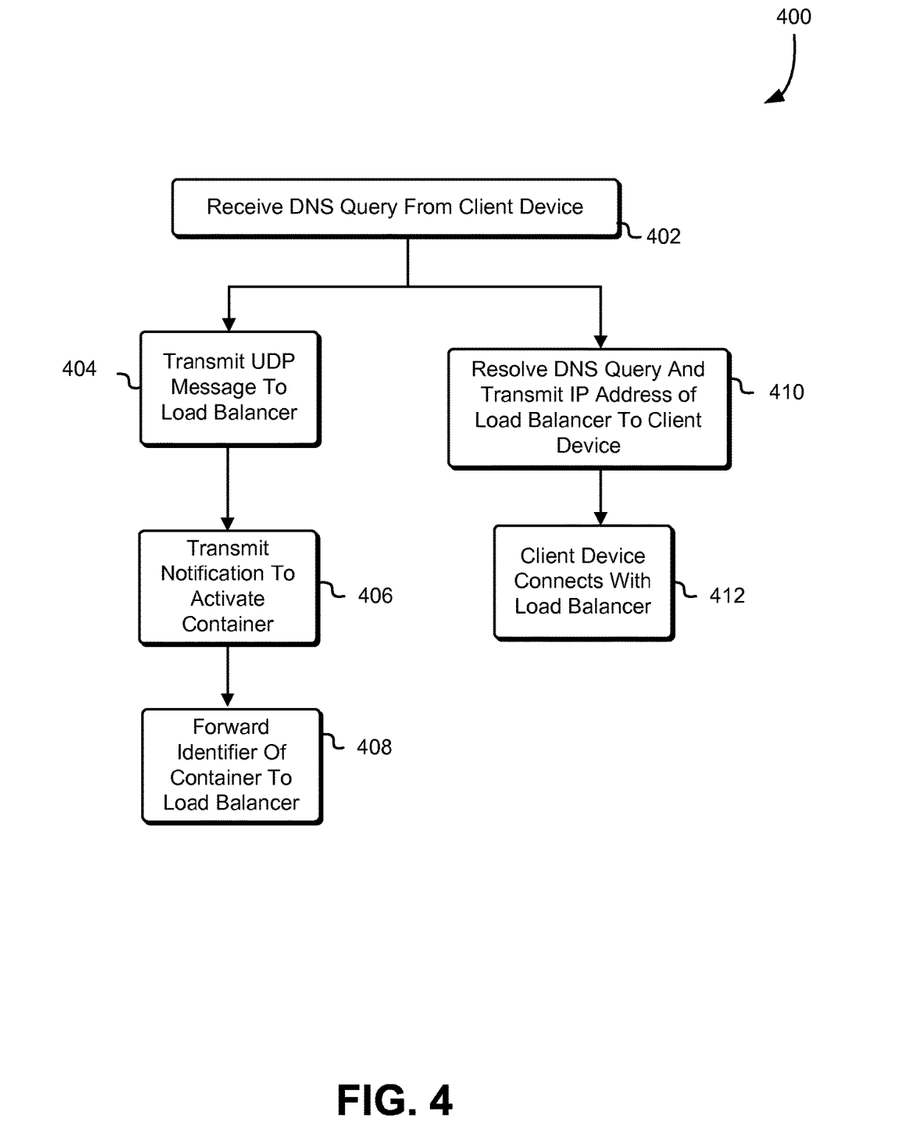
FIG. 4 is an illustrative example of a process for resolving Domain Name System queries in accordance with at least one embodiment.

FIG. 4 is an illustrative example of a process 400 that may be used to respond to a DNS query by a DNS server, such as the DNS server 105 described and illustrated in connection with FIG. 1. In an embodiment, the process 400 includes receiving a DNS query from a client device (402), which may be a submitted by a client device over a network, such as described above. The request may be received, for instance, by a customer of a client device to a DNS server or service processing system for the DNS, such as described above in connection with FIG. 1. Returning to FIG. 4, the DNS service or server transmits a user datagram protocol (UDP) message to a load balancer (404). The load balancer could be hardware or a load-balancing layer in a software application. Alternative embodiments can include the DNS server transmitting the UDP message to a proxy server or other network component or via multiple intermediary components. Alternative example embodiments include the DNS server transmitting a different message or request using a protocol other than UDP.

In parallel with the transmission of the UDP message, the DNS service is configured to resolve the DNS query and transmit an Internet protocol (IP) address of the load balancer to a client device of the client transmitting the DNS query (410). Alternative example embodiments may include transmitting the UDP message at a separate time from the transmission of the IP address to the client device. As the process 400 continues, after the IP address of the load balancer has transmitted to the client device, the client device may connect with the load balancer (412).

As the process 400 continues, after the DNS server transmits the UDP message to the load balancer, the DNS server transmits a notification to activate a container (406), such as the container 121 illustrated and described in connection with FIG. 1. The DNS server may transmit the notification directly to the container, to a resource service that maintains the container, to a hardware component or farm that supports the container, to the load balancer or load-balancing layer or to other network components that can communicate with the container. Returning to FIG. 4, the DNS server or other network component may be configured to forward an identifier of the container that stores the resource associated with the DNS query to the load balancer (408). In one example embodiment, the IP address of the load balancer is a public IP address that is hosted by the DNS. In alternative example embodiments, the IP address of the load balancer may be hosted by a distinct or separate web service and would require additional action. For example, a container may have a private IP address, such that the IP address is not exposed publically to the Internet, thus, in such a case, the load balancer would be configured to proxy all traffic, e.g., a proxying load balancer. Further example embodiments may include a container being instantiated would receive a public IP address, such that the container would be exposed to the Internet and thus the client and container may communicate directly, without the need for a load balancer or other proxy.

As the process 400 continues, in parallel with the transmission of the UDP message, the DNS server resolves the DNS query and transmits the IP address of the load balancer to the client device (410) and a client device may connect with the load balancer (412). In alternative example embodiments, the client device may be configured to connect directly with the container.

Figure 5:
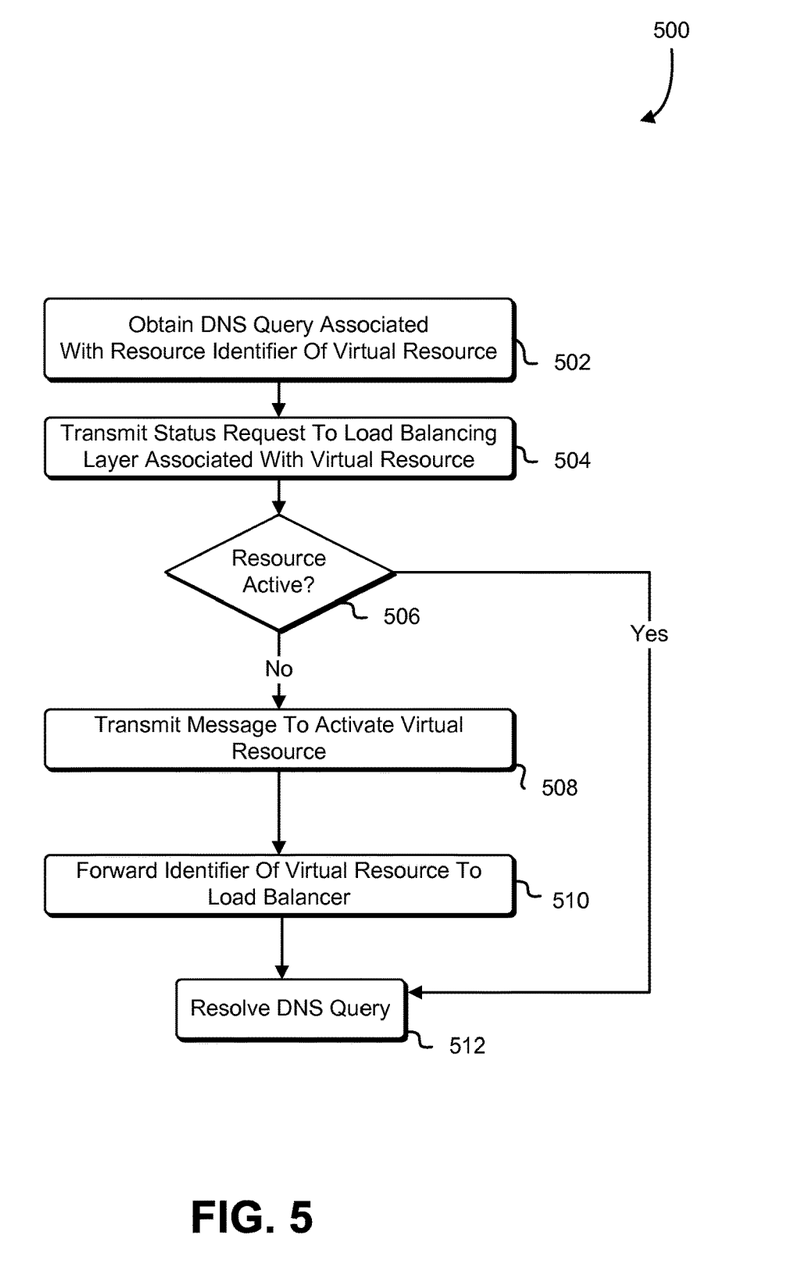
FIG. 5 is an illustrative example of a process for determining the status of a virtual resource in accordance with at least one embodiment.

FIG. 5 is an illustrative example of a process 500 that may be used to determine if a virtual resource, such as the container 121 illustrated and described in connection with FIG. 1, is active. The process 500 begins by obtaining, at a DNS server or service, a DNS query associated with a resource identifier of a virtual resource (502). The resource identifier may be a unique identifier that is included in a portion of the DNS query. The DNS server further transmits a status request notification to a load-balancing layer or a load balancer associated or operably interconnected with the virtual resource (504). The process 500 continues by a load balancer determining if the status of a virtual resource is active (506), for example, if the container is currently instantiated. If the container is active, the DNS server may resolve the DNS query (512). If the container is not active, than the DNS server or other network component is configured to transmit a message to activate the virtual resource (508). The DNS server or other network component is configured to transmit or forward an identifier of the virtual resource to the load balancer and the virtual resource will be re-instantiated (510). At which point the virtual resource is active, the DNS server may resolve the DNS query (512).

Figure 6:
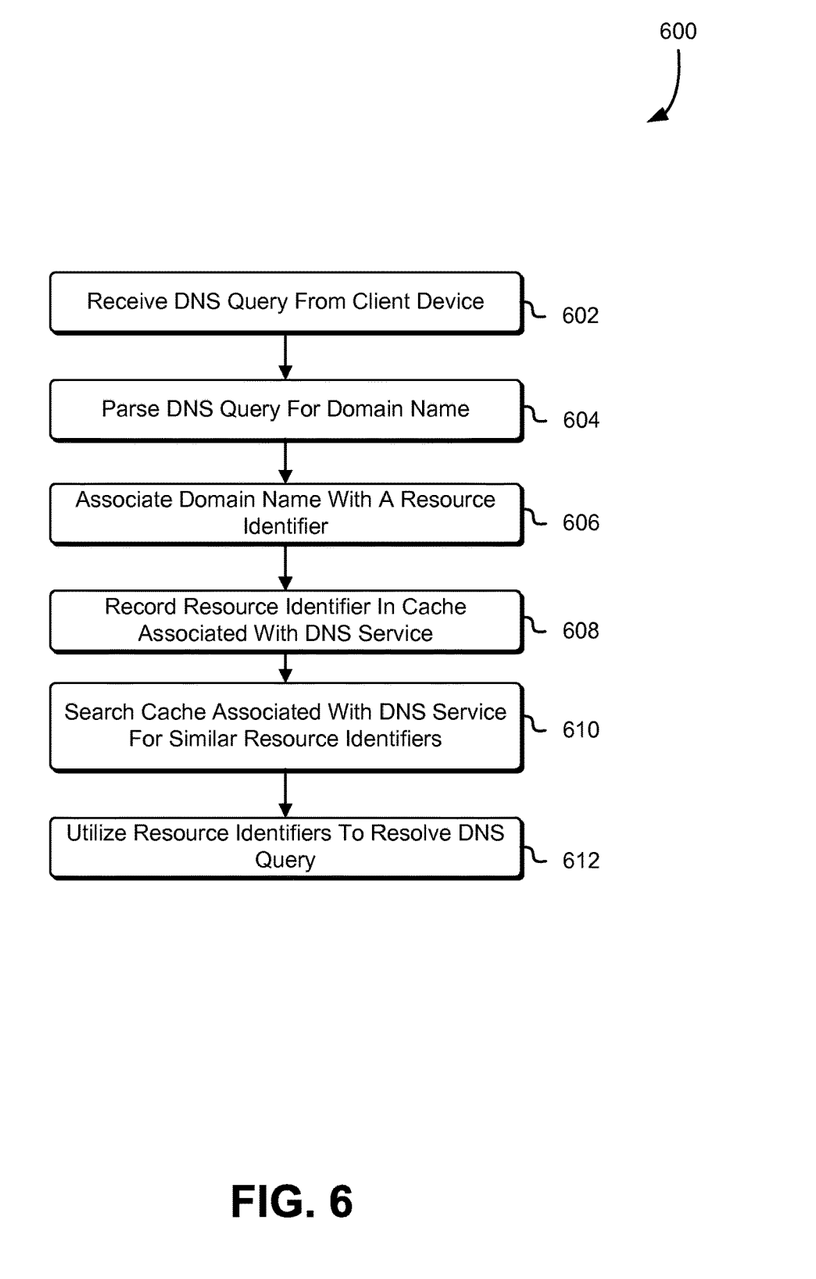
FIG. 6 is an illustrative example of a process for associating DNS information with record resources in accordance with at least one embodiment.

FIG. 6 is an illustrative example of a process 600 that may be used to associate domain name system information with Internet protocol address. The process 600 can be performed by one of many network components, for example, by a DNS service. The DNS service receives a DNS query from a client device (602) and parses at least a portion of the DNS query for the domain name (604). The DNS service associates the domain name with a resource identifier (606) and records the resource identifier in a cache associated with the DNS service (608). In alternative example embodiments, the DNS service could record the resource identifier information in a database or file accessible to the DNS service. The records may further include additional information known about the customer of the client device, for example, their billing agreements, quality of service agreements, service provider information, network provider information and the like. Returning to FIG. 6, a DNS service can search the cache associated with the DNS service for similar resource identifiers (610). If a resource identifier already exists in the cache, the resource records can be compared to determine if any information is missing or updated. The DNS service can utilize the resource identifiers to resolve DNS queries (612) currently or at a future time.

Figure 7:
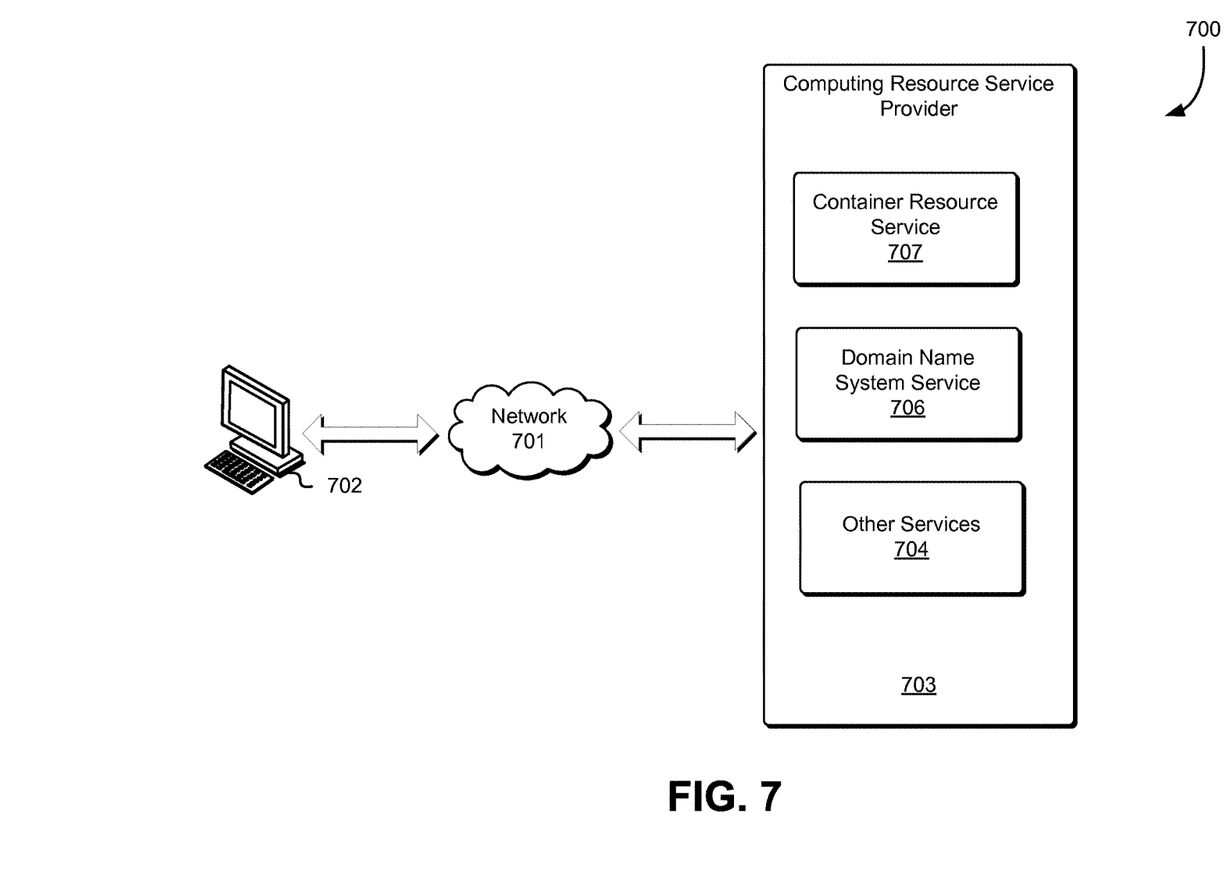
FIG. 7 is an illustrative example of an environment in accordance with at least one embodiment.

FIG. 7 shows an illustrated example of an environment 700 in which various embodiments of the present disclosure may be practiced. In the environment 700, a computing resource service provider 703 may provide a variety of services to a customer 702. The customer 702 may be an organization that may utilize the various services provided by the computing resource service provider 703 to operate and manage business needs. As illustrated in FIG. 7, the customer 702 may communicate with the computing resource service provider 703 through one or more communications networks 701, such as the Internet. Some communications from the customer 702 to the computing resource service provider 703 may cause the computing resource service provider 703 to operate in accordance with various techniques described herein or variations thereof. The container resource service 707 may be a collection of hardware and virtual computer system maintained on a fleet or multiple fleets of hardware capable of running containers The Domain Name System (DNS) service 706 may be designed to give customers a method to route end users to one or more communications network applications. For instance, the DNS service 706 may be configured to translate human-readable names, such as uniform resource locators (URLs), into numeric Internet Protocol (IP) addresses that computer systems may use to connect to each other over the Internet. Thus, the DNS service 706 may be configured to connect requests to access one or more services provided by the computing resource service provider to the infrastructure that is operating within a particular data zone. The DNS service 706 may additionally be configured to route customers of the computing resource service provider 703 to infrastructure outside of a particular data zone, such as another computing system operated by a separate provider.

The computing resource service provider 703 may additionally maintain one or more other services 704 based on the needs of its customers. For instance, the computing resource service provider 703 may maintain an account service that may comprise a collection of computing resources that collectively operate to maintain customer account information for each customer 702 of the computing resource service provider 703. The account service may include, for example, the customer name, address, phone numbers, billing details and other personal identification information for each customer 702 of the computing resource service provider 703. Additionally, the account service may include cryptographic keys or other credentials that may be used to verify that a customer 702 has the proper authorization to access the one or more services provided by the computing resource service provider 703. Other services include, but are not limited to, authentication services and services that manage other services and/or other services.

Figure 8:
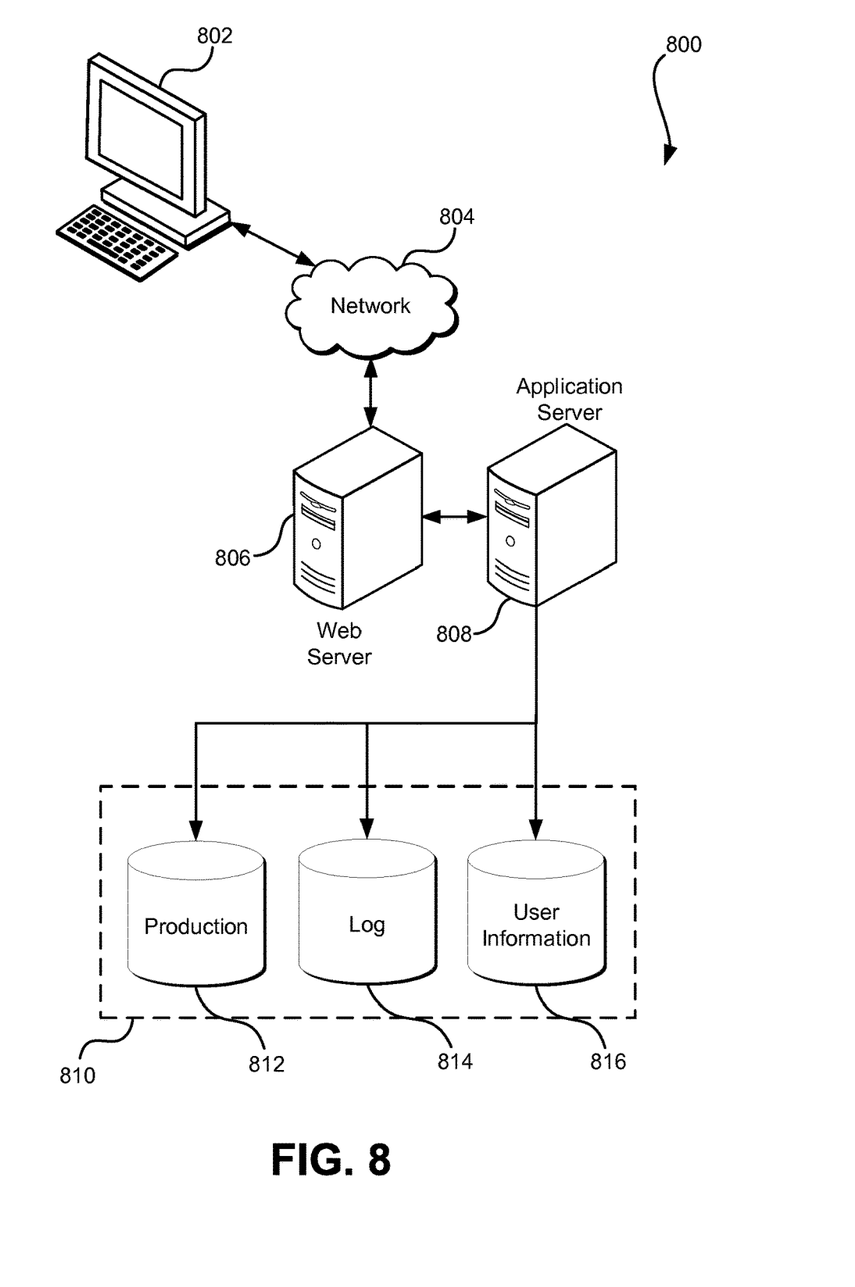
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information.

The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
receiving, from a Domain Name System (DNS) service, a message indicating a DNS request, made by a client device, to resolve a uniform resource locator (URL) to an Internet Protocol (IP) address;

as a result of receiving the message, instantiating the container thereby enabling the instantiated container to process a request transmitted to the IP address, the container being an operating system-level virtualization of an environment of a computing resource;

receiving, from the client device, the request directed to the IP address; and sending the received request to the instantiated container.

2. The computer-implemented method of claim 1, wherein instantiating the container comprises utilizing information in the DNS request to instantiate the container prior to a request for a resource being transmitted to the container.

3. The computer-implemented method of claim 2, wherein the request is routed to the container via a load balancer and wherein the DNS service is configured to send an IP address of the load balancer to the client device.

4. The computer-implemented method of claim 2, wherein the resource is virtual machine, a web resource, an image, a web form, a static webpage, a website, or an application programming interface.

5. A system, comprising:
at least one computing device implementing one or more services, wherein the one or more services:
receive a request, from a requestor, to resolve a first identifier of a resource stored in a container to a second identifier of the resource stored in the container, the container being a virtualization of an environment of the resource; and
transmit, to a system different from the requestor that is operable to instantiate the container, a notification of the request involving the first identifier for the resource stored in the container.

6. The system of claim 5, wherein the request is received by a Domain Name System (DNS) service, the DNS service is operably interconnected with a load-balancing layer configured to provide an Internet Protocol (IP) address to the container.

7. The system of claim 6, wherein the load-balancing layer is operably interconnected with a timer and configured to monitor a time between an instantiation of the container and a next request for the resource in the container.

8. The system of claim 6, wherein the load-balancing layer is configured to control a time-out value, when the time-out value equals a maximum value, the load-balancing layer is configured to transmit a message to the container to terminate operational status, wherein the maximum value can be a predetermined value or a dynamically set value.

9. The system of claim 6, wherein the one or more services are further configured to transmit a message to the load-balancing layer to instantiate at least two containers, wherein the at least two containers include a first resource and a second resource accessibly by the first resource.

10. The system of claim 6, wherein the load-balancing layer is configured to keep the container instantiated to process future requests for a length of time determined based at least in part on a time value associated with the request.

11. The system of claim 10, wherein determining the length of time to keep the container instantiated includes determining the length of time based at least in part on a location in which the container is running, a number of compute cycles, a maximum or minimum financial cost, or a media acknowledgment related to at least one resource store in the container.

12. The system of claim 10, further comprising dynamically setting a run time for the container during a lifecycle of the container, wherein the run time is based at least in part on a function of geographic rotation, a function of geographic location of a user requesting access to the container or a function of a type of resource the container is hosting.

13. A non-transitory computer-readable storage medium having stored thereon executable instructions that, if executed by one or more processors of a computer system, cause the computer system to at least:
detect a request made, by a client device, to resolve a first identifier associated with a container to a second identifier of a resource stored in a network component, the container comprising code to be executed to process the request;
load the code to process the request; and
as a result of the detecting, initiate the network component to pre-warm a cache associated with the network component before the client device transmits a request referencing the second identifier.

14. The non-transitory computer-readable storage medium of claim 13, wherein the instructions further comprise instructions that, when executed by the one or more processors, cause the computer system to maintain a cache operably interconnected to a domain name system (DNS) server.

15. The non-transitory computer-readable storage medium of claim 13, wherein the instructions further comprise instructions that, when executed by the one or more processors, cause the computer system to maintain resource records in the cache of the network component, wherein the resource records include information related to the client device, a customer of a client device and/or information related to services requested by the client device.

16. The non-transitory computer-readable storage medium of claim 15, wherein the instructions that cause the computer system to maintain resource records in the cache of the network component further include instructions that cause the computer system to:
search the cache for resource records corresponding to the request; and
utilize the resource records to resolve the request.

17. The non-transitory computer-readable storage medium of claim 13, wherein the instructions further comprise instructions that, when executed by the one or more processors, cause the computer system to instantiate a virtual machine or a container in response to a network component pre-loading data related to a resource into the cache of the network component.

18. The non-transitory computer-readable storage medium of claim 17, wherein the instructions that cause the computer system to instantiate the virtual machine or the container further include instructions that cause the computer system to selectively transmit a message that includes a type of the resource, wherein the type of the resource includes a virtual machine, a web resource, an image, a web form, a static webpage, or an application programming interface.

19. The non-transitory computer-readable storage medium of claim 13, wherein the instructions further comprise instructions that, when executed by the one or more processors, cause the computer system to determine a point of presence (PoP) location to send a user request.

20. The non-transitory computer-readable storage medium of claim 19, wherein the instructions that cause the computer system to determine the PoP location to send the user request further include instructions that cause the computer system to transmit a message to the PoP location, the message including a notification of incoming activity.

* * * * *